United States Patent [19]
Vogel et al.

[11] Patent Number: 5,810,519
[45] Date of Patent: Sep. 22, 1998

[54] HELICAL CUTTING INSERT WITH OFFSET CUTTING EDGES

[75] Inventors: Scott W. Vogel, Raleigh; Kenneth G. DeRoche, Cary; Earl L. Griffin, Holly Springs, all of N.C.

[73] Assignee: Kennametal Inc., Latrobe, Pa.

[21] Appl. No.: 406,267

[22] Filed: Mar. 17, 1995

[51] Int. Cl.⁶ ................................................... B23C 5/20
[52] U.S. Cl. ........................ 407/114; 407/116; 407/120
[58] Field of Search .......................... 407/42, 113, 114, 407/115, 116, 120

[56] References Cited

U.S. PATENT DOCUMENTS

| | | |
|---|---|---|
| 3,551,978 | 1/1971 | Berry, Jr. . |
| 3,715,788 | 2/1973 | Ayer . |
| 3,762,005 | 10/1973 | Erkfritz . |
| 4,130,371 | 12/1978 | Druxeis . |
| 4,248,553 | 2/1981 | Kraemer . |
| 4,531,864 | 7/1985 | Bylund . |
| 4,541,756 | 9/1985 | Kubota . |
| 4,552,492 | 11/1985 | Komanduri et al. . |
| 4,583,431 | 4/1986 | Komanduri et al. . |
| 4,588,332 | 5/1986 | Komanduri et al. . |
| 4,693,641 | 9/1987 | Tsujimura et al. . |
| 4,699,549 | 10/1987 | Shimomura et al. . |
| 4,840,518 | 6/1989 | Plutschuck et al. . |
| 4,940,369 | 7/1990 | Aebi et al. . |
| 4,988,241 | 1/1991 | Colligan . |
| 5,052,863 | 10/1991 | Satran . |
| 5,071,292 | 12/1991 | Satran . |
| 5,078,550 | 1/1992 | Satran et al. . |
| 5,085,542 | 2/1992 | Nakayama et al. . |
| 5,158,402 | 10/1992 | Satran et al. . |
| 5,192,171 | 3/1993 | Ther et al. ........................ 407/116 X |
| 5,199,827 | 4/1993 | Pantzar ........................ 407/116 X |
| 5,232,319 | 8/1993 | Satran et al. . |

FOREIGN PATENT DOCUMENTS

| | | | |
|---|---|---|---|
| 307563 | 7/1988 | European Pat. Off. . | |
| 0566085 | 10/1993 | European Pat. Off. | ............... 407/113 |
| 3618574 | 12/1986 | Germany | ............... 407/114 |
| 59-196107 | 6/1984 | Japan . | |
| 1313568 | 5/1987 | U.S.S.R. | ............... 407/120 |

OTHER PUBLICATIONS

Iscar, "ADKT Flic–Flac," (1992), 5 pp.
Iscar, "Helimill, The Positive 'TwoFaced' Endmill," (1992), 4 pp.
Iscar, "Just Developed, New for IMTS 92," (1992), 6 pp.

*Primary Examiner*—A. L. Pitts
*Assistant Examiner*—Henry W. H. Tsai
*Attorney, Agent, or Firm*—John J. Prizzi; James G. Porcelli

[57] ABSTRACT

A cutting insert for use in a rotary milling tool is provided. The cutting insert includes an insert body including a bottom face, a top face, and a side face. A stepped cutting edge is formed at the intersection of the top face and the side face for engaging a workpiece and removing a chip from it. The stepped cutting edge includes at least two offset edge portions which produce distinct, transversely-spaced chip segments during the cutting operation. The offset edge portions are connected by transition edge portions which are disposed at an obtuse angle with respect to the offset edge portions. The angle of the transition edge portions tends to spread the individual chip segments apart during the machining operation to effect a thinning of the chip between the individual chip segments. The entire cutting edge is helically curved so that the cutting edge lies on the surface of a circumscribing cylinder defined by the rotation of the cutting edge about the axis of the milling cutter.

20 Claims, 6 Drawing Sheets

HELICAL CUTTING INSERT WITH OFFSET CUTTING EDGES

BACKGROUND OF THE INVENTION

The present invention relates generally to cutting inserts for rotatable milling cutters, and more particularly to a replaceable cutting insert having a plurality of mutually offset cutting portions with helically-shaped cutting edges for cutting straight sidewalls.

A milling cutter typically includes a cylindrical body having a plurality of recesses formed in its outer surface for receiving replaceable cutting inserts. Each cutting insert has at least one cutting edge which engages the workpiece to perform the milling operation. When designing cutting inserts for milling cutters, it is desirable to reduce cutting forces experienced by the cutting edge of the insert. Reduction of cutting forces will reduce wear and breakage of the insert and increase tool life. Lower cutting forces also reduce the horsepower requirements for milling operations. The magnitude of such cutting forces is largely determined by the geometry of the cutting insert, and its orientation with respect to the workpiece.

In most rotary milling cutters, the inserts are formed with a straight cutting edge. To reduce the cutting forces experienced by such a straight edge, the cutting insert is typically mounted so that it is inclined at an angle relative to the axis of rotation. Such an axial inclination is referred to as an axial rake angle, and corresponds to the angle A in FIG. 7, where CL represents to axis of rotation. But while such an axial inclination enhances the cutting efficiency of the insert, it also creates a variation in the distance of the cutting edge from the axis of rotation of the milling head along the length of the cutting edge, such that the points of contact of the cutting edge with the workpiece are not all disposed at the same radial distance from the axis. This variation results in an undesirable convex curvature in the side surfaces of the cuts made by the cutter. The larger the axial rake angle, the greater will be the curvature in the side surfaces of the resulting cuts. Additionally, for inserts tilted at an axial rake angle, the cutting load forces, and thus the energy requirement for cutting, are proportional to the length of the cutting edge due to the effect of such axial tilting on the angle between the cutting edge and the surface being cut. The top face of the insert is also important for cutting efficiency. One such feature of the top face is the angle formed by the rake surface of the insert relative to the workpiece. Such an angle is known as the radial rake angle and is illustrated as the angles c1, c2 and c3 in FIGS. 9 through 11, respectively. When the radial rake angle is positive, the edge of the insert cuts the workpiece by way of a shaving action. When the radial rake angle is negative, the edge of the insert cuts the workpiece by way of a scraping action that is substantially less efficient than a shaving action. As the length of the cutting edge increases, more of the cutting edge tends to be oriented at a negative radial rake angle with respect to the workpiece, which causes the cutting force loads to increase. Such increased loads are contrary to the goals of decreasing cutting force loads whenever possible to reduce the risk of tool breakage, reducing wear on the insert, and reducing the energy requirements needed for the cutting operation.

To reduce such cutting forces, it has been known to use a plurality of cutting inserts with relatively short cutting edges in lieu of a single insert with a single long cutting edge. The inserts are arranged so that the short cutting edges overlap. While such an arrangement significantly reduces cutting forces, the cutting inserts must be precisely aligned with one another in order to produce a smooth cut.

Clearly there is a need for a cutting insert that is capable of producing cuts with smooth, straight side edges even when operated at substantial axial rake angles that does not require the use of deep, structurally weakening recesses in the tool body. Ideally, the cutting edge of such an insert should engage the workpiece at a positive radial rake angle throughout substantially all its length to minimize cutting forces and insert wear. Finally, it would be desirable if such an insert could more effectively break up the metal chips that result from the cutting action to enhance the overall efficiency of the tool employing the insert.

SUMMARY OF THE INVENTION

The present invention is a cutting insert particularly designed for use in rotatable cutting tools, such as rotary milling cutters and drills. The insert includes a polygonal insert body having a planar bottom face, a top face, and plurality of side faces extending between the top and bottom faces. A cutting edge is defined at the intersection of the top face with at least one of the side faces for engaging the workpiece and removing chips from the workpiece. The cutting edge includes at least two offset edge portions which are connected by a transition edge portion. The transition edge portion is disposed at an obtuse angle with respect to the offset edge portions.

The cutting edge of each of the edge portions and the transition edge portion is disposed on a cylindrical envelope defined by the rotation of the cutting edge about the axis of the milling cutter, which gives each of the cutting edges a helical curvature. The helical curvature of each portion of the cutting edge ensures a relatively smooth, straight sidewall surface on the workpiece.

During a machining operation, the offset edge portions of the cutting edge produce narrow, transversely-spaced chip segments, while the transition edge portion spreads the chip segments apart to effect a thinning of the chip between the chip segments. Such thinning produces localized work hardening of the chip between the chip segments, which embrittles the chip and renders chipbreaking easier.

In yet another aspect of the present invention, the cutting edge of each of the offset portions is inclined with respect to the base edge of the insert. By inclining each of the cutting edges with respect to the base edge, it is possible to achieve higher axial rake angles without deeply recessing the insert seats in the milling cutter, which in turn could cause excessive structural weakening of the cutter body.

Based on the foregoing, it is an object of the invention to provide cuts in workpieces with straight sidewalls even when the inserts are canted at substantial axial rake angles in the milling cutter body.

It is a further object of the invention to provide a cutting insert for a rotary milling tool with enhanced chipbreaking capabilities.

It is also an object of the present invention to provide a cutting insert for a rotary milling tool having a cutting edge that engages the workpiece at a positive radial rake angle throughout its entire length to reduce cutting forces and wear on the insert.

Another object of the present invention is to provide a cutting insert for a rotary milling tool which reduces the horsepower requirements for milling operations as compared to prior art cutting inserts.

Other objects and advantages of the present invention will become apparent from a study of the following description and the accompanying drawings which are merely illustrative of such invention.

BRIEF DESCRIPTION OF THE SEVERAL FIGURES

Figure 8:
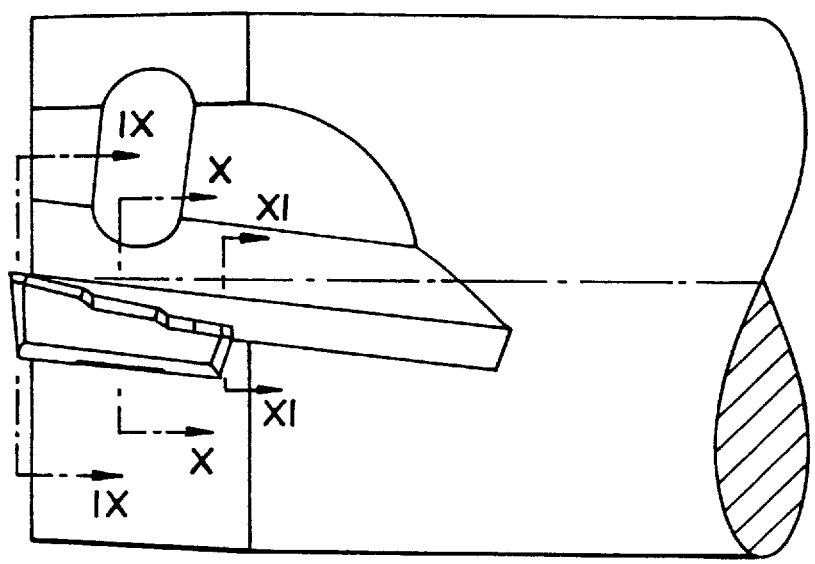
FIG. 8 is an elevational view of a milling cutter showing the cutting insert mounted thereon.
Figure 9:
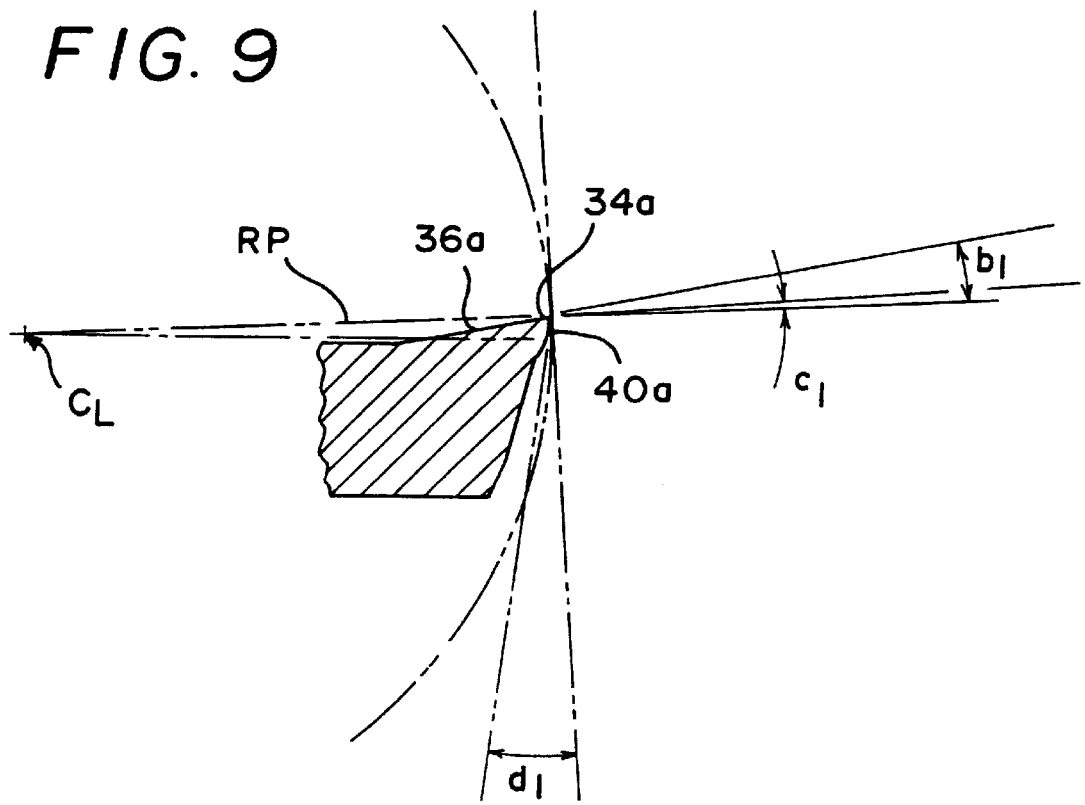
Figure 10:
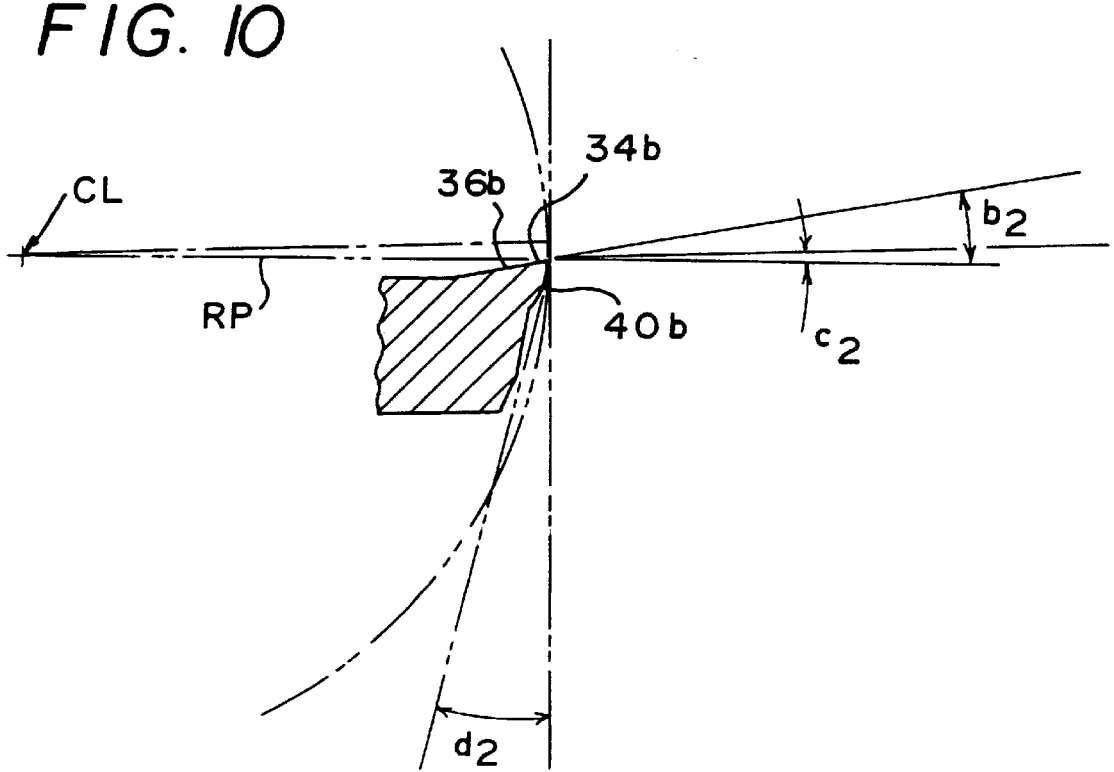
Figure 11:
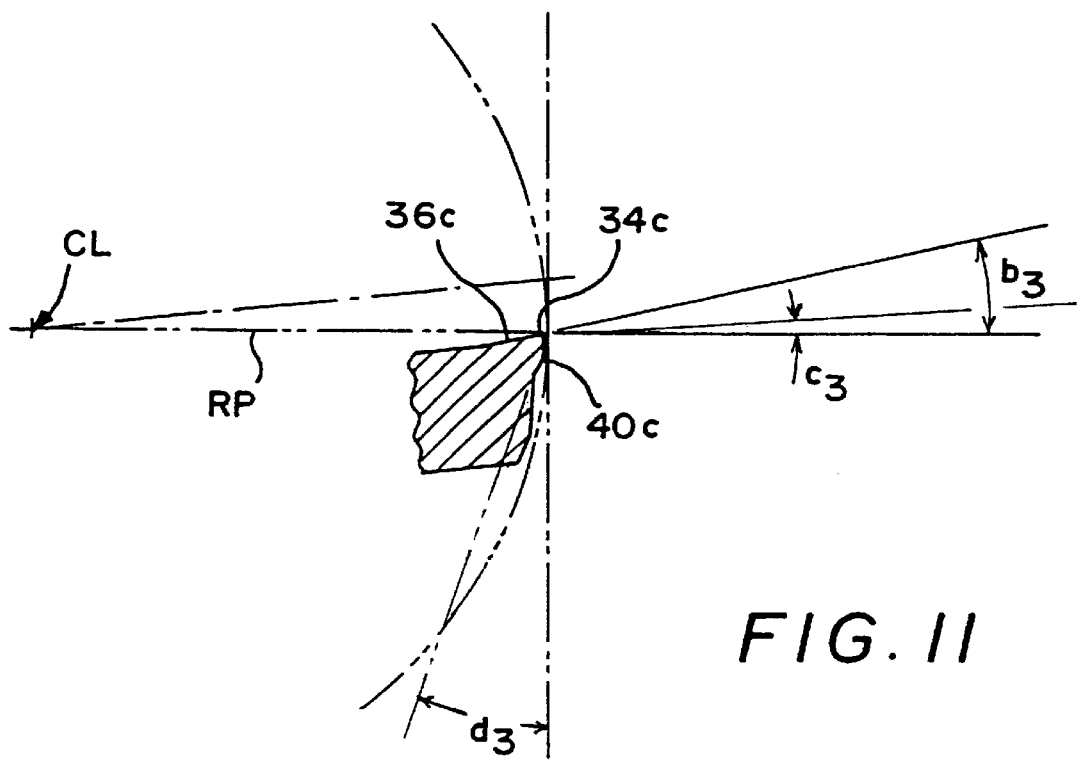
Figure 12:
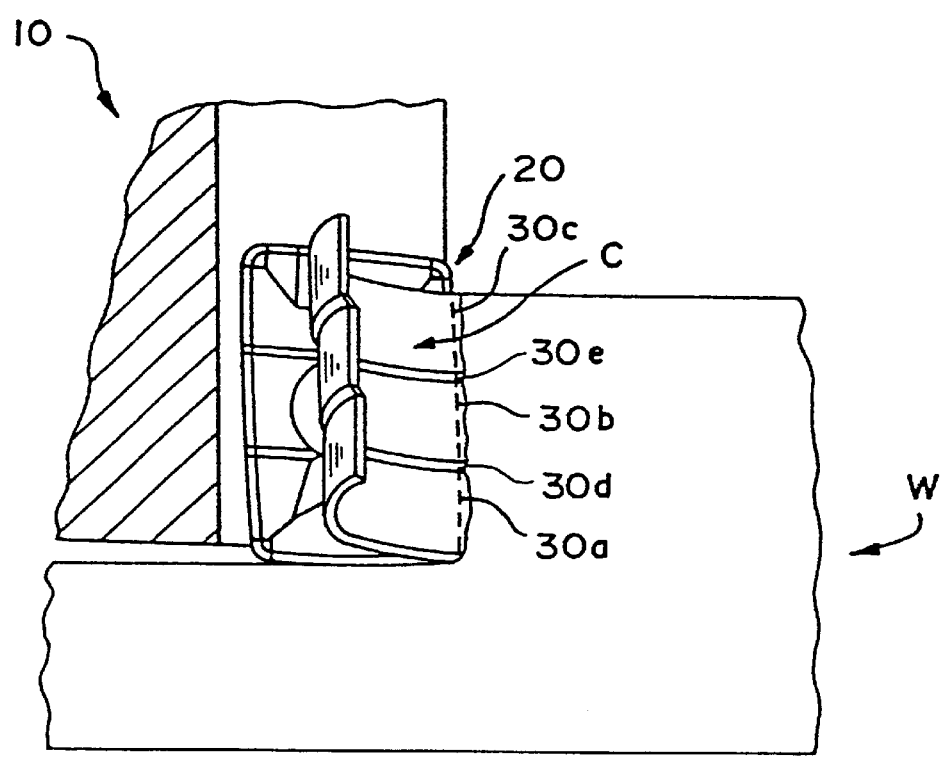

FIGS. 9, 10, and 11 are fragmented cross-sectional views taken through lines IX—IX, X—X, and XI—XI, respectively, of FIG. 8, and FIG. 12 is a top plan view of the cutting insert during a milling operating showing the production of a chip from the workpiece.

DETAILED DESCRIPTION OF THE SEVERAL FIGURES

Figure 1:
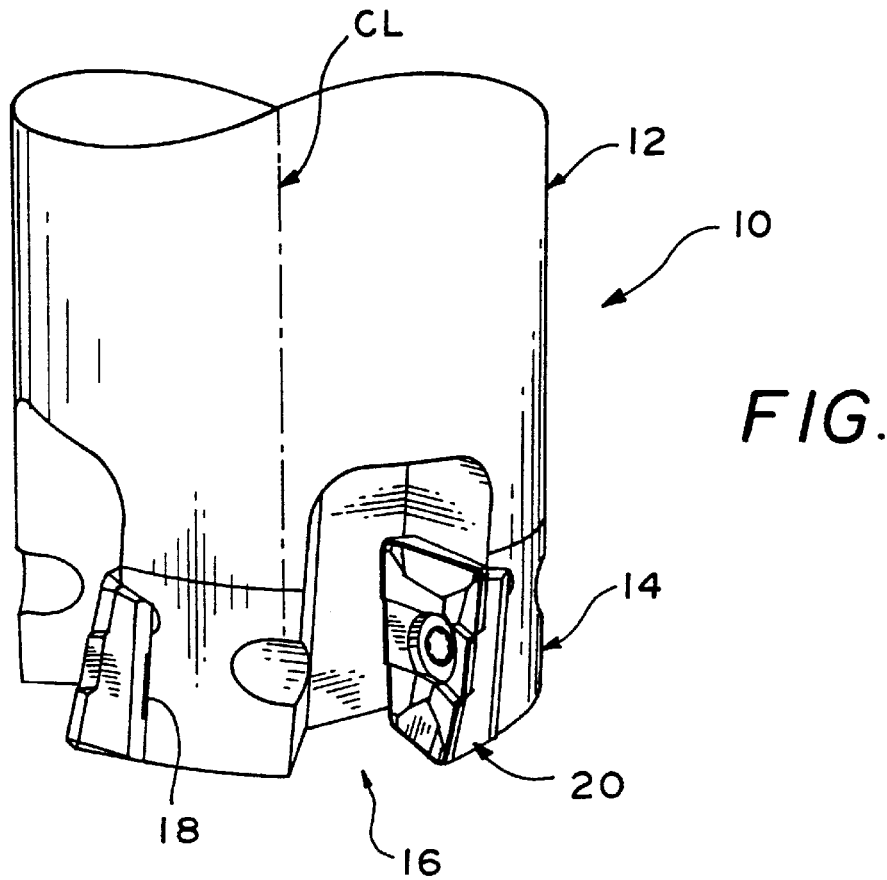
FIG. 1 is an perspective view of a milling cutter using the cutting insert of the present invention.
Figure 2:
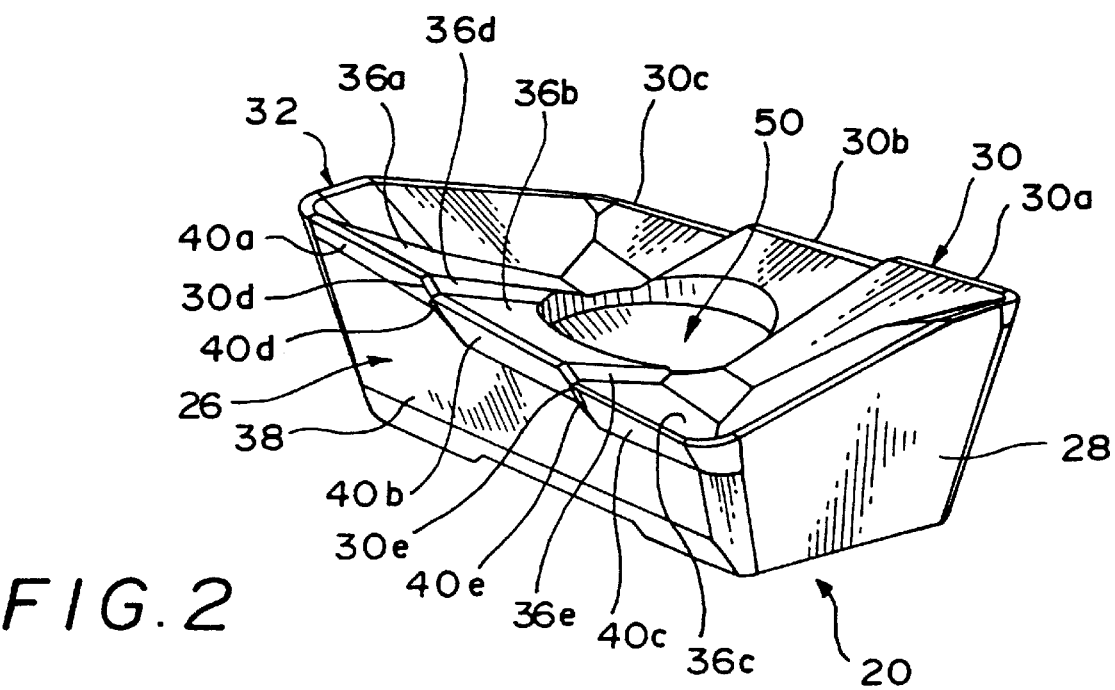
FIG. 2 is a perspective view of the cutting insert of the present invention.

Referring now to the drawings, and particularly to FIG. 1, there is shown a rotary milling cutter indicated generally by the numeral 10. The milling cutter 10 is rotatable about a longitudinal axis CL. The rotary milling cutter 10 includes a shank portion 12 adapted to be mounted on a machine tool (not shown) and a cutting head portion 14. The cutting head portion 14 includes a plurality of circumferentially spaced recesses 16. Each recess 16 includes a support surface 18 on which a cutting insert 20 is mounted.

Referring now to FIGS. 2 through 5, there is shown a cutting insert 20 produced in accordance with the present invention. The cutting insert 20 comprises a generally polygonal insert body manufactured from a hard, wear-resistant material such as one of a number of refractory coated cemented carbide materials, which are well known in the art.

The insert body has a central opening 50 through which a securing screw (not shown) extends to mount the insert to the support surface 18 of the milling cutter 12. The insert includes a generally flat bottom face 22, a top face 24, opposed side flanks 26, and opposed end flanks 28. Both the side flanks 26 and end flanks 28 are planar. The intersection of the side flanks 26 with the top face 24 defines a pair of cutting edges indicated generally by the numeral 30. The intersection of the end flanks 28 with the top face 24 define a pair of side edges 32.

Figure 7:
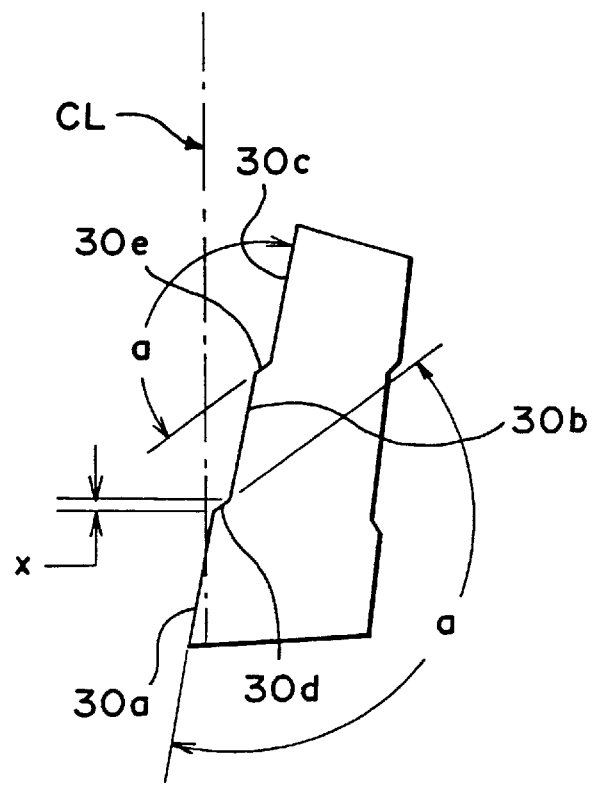
FIG. 7 is a side elevational view of the cutting insert shown in silhouette.

The cutting edge 30 has a stepped configuration. Each cutting edge 30 is broken into offset edge portions 30a, 30b and 30c, and transition edge portions 30d and 30e. The offset edge portions 30a, 30b, and 30c are inclined with respect to the bottom face 22 of the insert 20 at an average angle of approximately 5° as can be most clearly seen in FIGS. 3 and 7. By angling the offset edge portions 30a, 30b, and 30c relative to the base of the insert 20, it is possible to obtain a relatively large axial rake angle "A" as shown in FIG. 7 without the need for providing deeply recessed insert seats in the head portion 14 of the cutter. Such deeply recessed insert seats could cause excessive structural weakening of the cutter body 12.

The offset edge portions 30a, 30b, and 30c are connected by transition edge portions 30d and 30e. The transition edge portions 30d and 30e are inclined with respect to the bottom 22 of the insert 20 at an angle of inclination that is much greater relative to the bottom 22 than it is with respect to the offset edge portions 30a, 30b, and 30c, i.e., 45° versus 5°. The transition edge portions 30d and 30e form an obtuse angle "a" with the offset edge portions 30a, 30b, and 30c (as shown in FIG. 7). That is, the included angle "a" between the transition edge portion and its adjacent offset edge portion is greater than 90°.

FIG. 7 schematically shows an insert 20 as it is normally oriented with respect to both the center line CL of the milling cutter 10, and a workpiece. The trailing end of the offset edge portion 30a is spaced by distance "x" from the leading edge of the offset edge portion 30b as measured along the centerline CL of the milling cutter 10. Offset edge portions 30b and 30c are similarly spaced. Thus, when the cutting insert 20 is mounted in a milling cutter 10, the offset edge portions 30a, 30b, and 30c do not overlap. A plane extending perpendicularly from the center line intersecting one offset edge portion will not intersect any other offset edge portion. As a result, the transition edge portions 30d and 30e will be engaged in cutting a workpiece W during the milling operation, as shown in FIG. 12. The offset edge portions 30a, 30b, and 30c will produce three distinct chip segments during the milling operation. The transition edge portions 30d and 30e will create grooves between the three chip segments that will tend to divide the chip and help to embrittle it, thereby rendering chipbreaking easier.

Figure 6:
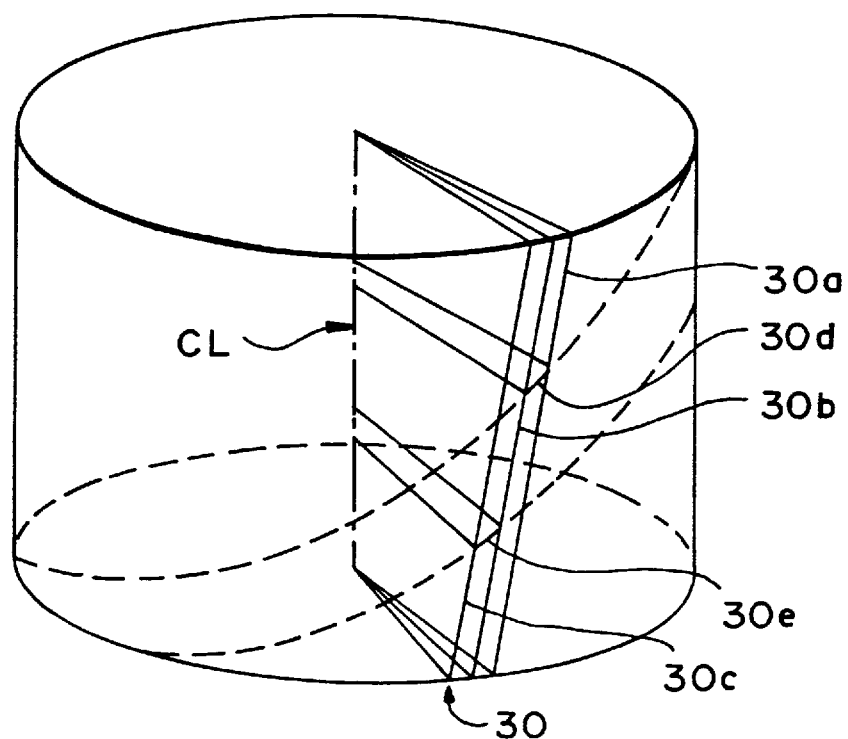
FIG. 6 is a diagrammatic illustration showing the cutting edge of the insert on a cylindrical envelope defined by the rotation of the cutting edge about the axis of the rotary milling tool.

As is best seen in FIG. 6, each of the offset edge portions 30a, 30b, and 30c, and the transition edge portions 30d and 30e has a helical curvature in order to insure a substantially flat machined surface along the sidewall of the cut produced by the cutter 10. The entire cutting edge 30 lies on a cylindrical envelope defined by the rotation of the cutting edge 30 about the centerline CL of the milling cutter 10. Each of the offset edge portions 30a, 30b, and 30c form a part of a large-pitch helix which lies on the surface of the cylindrical envelope. The three helixes which correspond to the offset edge portions 30a, 30b, and 30c are all parallel to each other. That is, the helix defined by each of the offset edge portions 30a, 30b, and 30c are equidistant from one another along their entire length. The transition edge portions 30d and 30e are likewise defined by two parallel helixes 31a, 31b (as indicated in phantom). The helixes defined by the transition edge portions 30d and 30e have a smaller pitch than the helixes defined by the offset edge portions 30a, 30b, and 30c. When the cutting edge 30 is formed with such a curvature, the side surface produced during machining operations will be flat.

Figure 4:
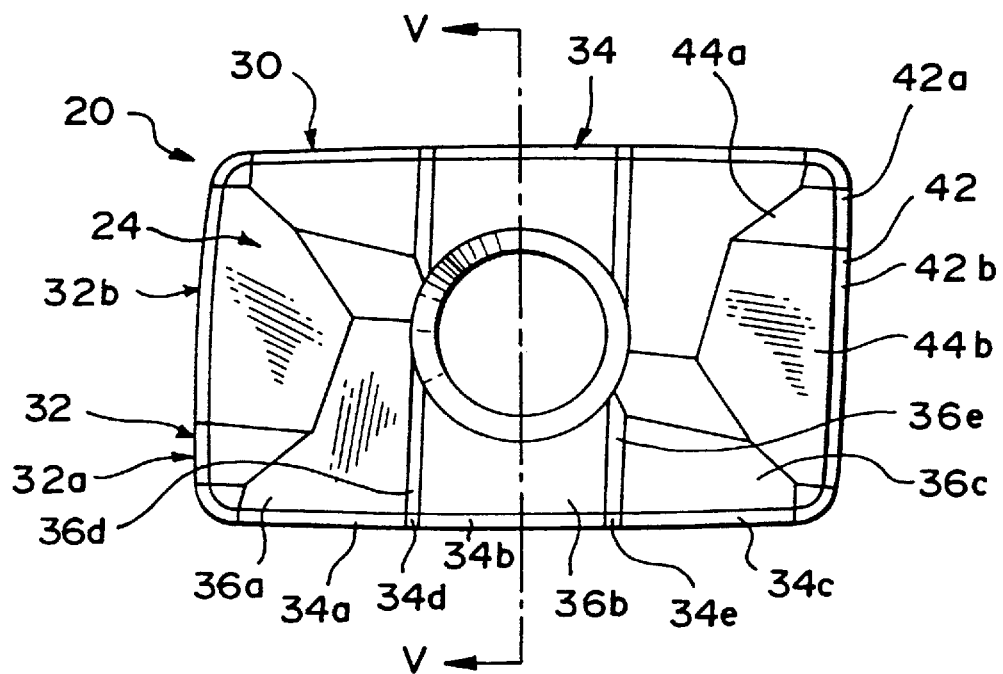
FIG. 4 is a top plan view of the cutting insert of the present invention.

Referring now to the top face 24 of the insert 20, shown best in FIG. 4, it is seen that a land 34 is formed adjacent to and parallel with the cutting edges 30. The land 34 is divided into five land surfaces 34a, 34b, 34c, 34d, and 34e. Each of the land surfaces 34a through 34e is a continuously curved surface which follows the contour of the cutting edge 30. These surfaces may have a helical contour. The land surfaces 34a, 34b, and 34c are bounded on one edge by respective offset edge portions 30a, 30b, and 30c of the cutting edge 30, while the land surfaces 34d and 34e are bounded on one edge by respective transition edge portions 30d and 30e. A plurality of rake surfaces 36a, 36b, 36c, 36d, and 36e decline downwardly from respective land surfaces 34a through 34e. The rake surfaces 36a through 36e are curved to blend with the land surfaces 34a through 34e. Each of these surfaces may also have a helical contour.

Figure 3:
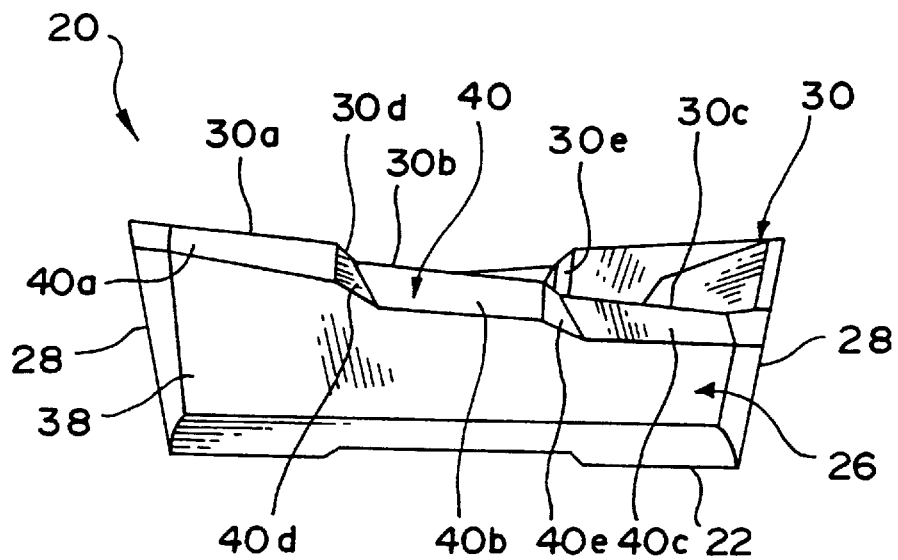
FIG. 3 is a side elevation view of the cutting insert of the present invention.
Figure 5A:
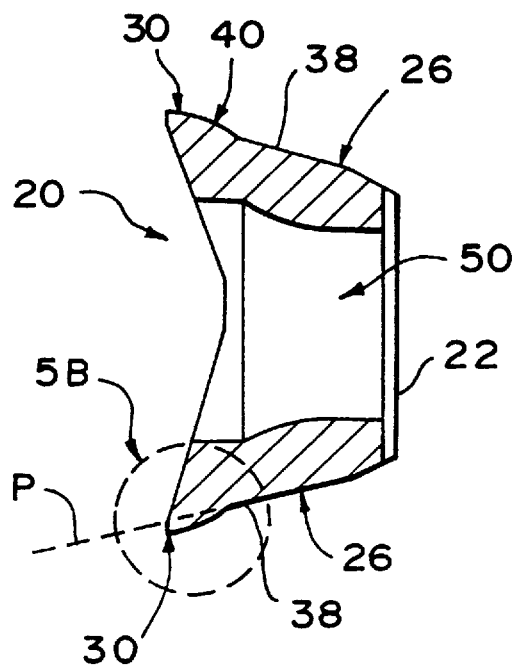
FIG. 5A is a cross-sectional view of the cutting insert of the present invention taken through the V—V of FIG. 4.
Figure 5B:
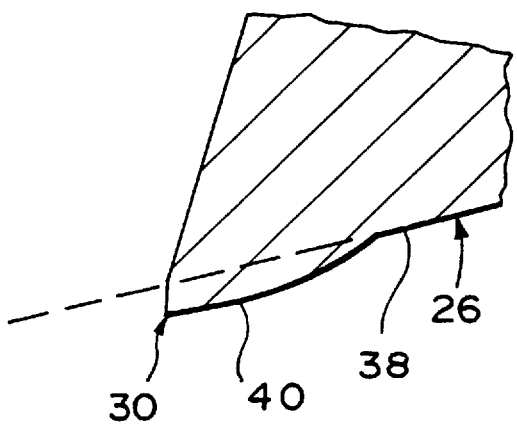
FIG. 5B is an enlargement of the section enclosed in the dotted circle in FIG. 5A.

The side flanks 26 of the insert 20, shown best in FIG. 3, include a generally planar lower portion 38 and an upper portion 40 which is curved along two different axes, as will be explained shortly. The planar lower portion 38 facilitates mounting the insert on the cutter body 12. The upper portion 40 is divided into five relief surfaces 40a, 40b, 40c, 40d, and 40e. The relief surfaces 40a through 40e are continuously curved with respect to a cylinder defined around the center line CL of the cutter 10 (as shown in FIG. 6) to provide a smooth transition from the planar lower portion 38 to the helical cutting edge 30. Each of these surfaces may have a helical contour. As is best seen in FIG. 5B, the relief surfaces 40a through 40e are also rounded with respect to the plane P (shown in phantom) that extends over the lower portion 38. The provision of such a radiused curvature just under the cutting edges advantageously strengthens the cutting edges 30a through 30e by providing them with more support. The relief surfaces 40a, 40b, and 40c are bounded on one edge by respective offset edge portions 30a, 30b, and 30c, while the relief surfaces 40d and 40e are bounded by respective transition edge portions 30d and 30e of the cutting edge 30.

Each end flank 28 of the cutting insert 20 is substantially planar. The end flank 28 forms a side edge 32 at an intersection with the top face 24 of the cutting insert 20. The side edge 32 includes a generally horizontal wiper portion 32a, and a downwardly sloping portion 32b (FIG. 4). A land surface 42 is formed in the top face 24 of the insert 20 adjacent the side edge 32. The land surface 42 includes portions 42a and 42b which are disposed adjacent the wiper portion 32a and downwardly sloping portion 32b of the side edge 32 respectively. Rake surfaces 44a and 44b incline downwardly from the land surfaces 42a and 42b.

Referring now to FIGS. 8 through 11, the radial rake angles and relief angle are shown at selected points along the cutting edge 30 as shown in FIG. 8. FIG. 9 shows a section view of the insert taken along line IX—IX in FIG. 8. FIG. 10 shows a section view of the insert 20 taken along line X—X of FIG. 8, while FIG. 11 shows a section view taken along line XI—XI of FIG. 8, respectively. In FIGS. 9 through 11, the circular path followed by the cutting edge 30 of an insert mounted with a rotary milling cutter rotating about centerline CL is superimposed on different cross-sections of the insert 20.

FIGS. 9 through 11 show the following angles:

$b_x$=radial rake angle of the rake surface;
$c_x$=radial rake angle of the land surface; and
$d_x$=relief angle.

The rake angle $b_x$ is the angle between the rake surface and a reference plane RP measured in a plane perpendicular to the axis of centerline CL and that extends between the centerline axis CL and a point along the cutting edge where the measurement is being taken. The rake angle $c_x$ is the angle between the land surface and the reference plane RP. As will be discussed, the rake and land surfaces may be curved. Under these circumstances, a best fit straight line over each curved surface will be sufficient for determining the radial rake angles.

The relief angle $d_x$ is defined as the angle formed between a line perpendicular to the reference plane RP and a line extending from the cutting edge downwardly along the relief surface 40. Since the relief surface is curved, then the relief angle will be measured from a line extending from the cutting edge downwardly along the relief surface 40 which is tangent to the relief surface at the cutting edge.

As can be clearly seen in FIGS. 9 through 11, the rake angles $b_x$ and $c_x$ increase from the leading portion of the cutting edge shown in FIG. 9, to the trailing portion of the cutting edge, shown in FIG. 11. In the preferred embodiment, the rake surface angle $b_x$ increases 38% from the leading end of the cutting edge to the trailing end, while the land surface angle increases 34% between these ends. The relief angle $d_x$ increases a similar proportion from the leading end of the cutting edge to the trailing end.

FIG. 12 illustrates a sketch of a cutting insert of the present invention being used to remove a chip from the workpiece. In this Figure, the insert is mounted on a cylindrical milling cutter 10 so as to perform a milling operation. The cutting edge 30 of the insert 20 engages the workpiece W and shears material from the workpiece W to form the chip C. As can be further seen, the offset edge portions 30a, 30b, and 30c of the cutting edge 30 produce a chip comprising three relatively narrow chip segments. During the cutting process, the transition edge portions 30d and 30e of the cutting edge 30 tend to spread the narrow chip segments apart to thin or weaken the chip between the segments. In certain materials, the thinning of the chip may result in the chip segments being separated completely into three smaller chips.

In view of the foregoing, it will be readily apparent that the cutting insert 20 of the present invention will reduce the cutting forces experienced by the cutting edge during milling operations, and consequently reduce horsepower requirements. Reduction of the cutting forces will also lead to longer tool life and smoother finished surfaces.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A cutting insert for use in a rotary milling tool comprising:

(a) an insert body including a bottom face, a top face, and a side face extending between the top and bottom faces;

(b) a stepped cutting edge defined at the intersection of the top face and the side face for engaging and cutting a workpiece and removing a chip therefrom, said stepped cutting edge including at least two offset edge portions, each of which creates a chip segment, and (c) means for engaging and cutting the workpiece and for creating a thinned chip portion between the chip segments created by said offset edge portions to facilitate the breaking of said chip segments, including a transition edge portion joining the offset edge portions, said transition edge portion intersecting said offset edge portions at an obtuse angle.

2. The cutting insert according to claim 1 wherein the offset edge portions are curved such that the offset edge portions lie on the surface of a circumscribing cylinder defined by the rotation of the cutting edge about the axis of the milling tool.

3. The cutting insert according to claim 2 wherein the offset edge portions are helical.

4. The cutting insert according to claim 3 wherein the offset edge portions are parallel to one another.

5. The cutting insert according to claim 2 wherein the transition edge portion means is curved such that the transition edge portion means lies on the surface of a circumscribing cylinder defined by the rotation of the cutting edge about the axis of the rotary milling tool.

6. The cutting insert according to claim 5 wherein the transition edge portion means is helical.

7. The cutting insert according to claim 2 wherein the side face of the insert adjacent the cutting edge includes a continuously curved relief surface adjacent each of the offset edge portions.

8. The cutting insert according to claim 2 wherein the top face includes a continuously curved rake surface adjacent each of the offset edge portions.

9. The cutting insert according to claim 1 wherein the offset edge portions of the cutting edge are disposed at an angle relative to the bottom face of the insert for increasing an axial rake angle of the edge portions relative to an axis of rotation.

10. A cutting insert for use in a milling tool that rotates about an axis, comprising:
   (a) an insert body including a bottom face, a top face, and a side face extending between the top and bottom faces;
   (b) a stepped cutting edge defined at the intersection of the top face and the side face for engaging a workpiece and removing a chip therefrom, said stepped cutting edge including at least two offset edge portions spaced apart from one another which produce distinct transversely spaced chip segments during a cutting operation, said offset edge portions being longitudinally spaced to avoid overlapping during a milling operation; and
   (c) means for engaging and cutting the workpiece and for creating a thinned chip portion between the chip segments created by said offset edge portions to facilitate the breaking of said chip segments including a transition edge portion joining the offset edge portions at an obtuse angle, the transition edge portion having an axial rake angle less than 90° such that cutting occurs continuously along the entire length of the cutting edge during milling operations.

11. The cutting insert according to claim 10 wherein the offset edge portions are curved such that the offset edge portions lie on the surface of a circumscribing cylinder defined by the rotation of the cutting edge about the axis of the milling tool.

12. The cutting insert according to claim 11 wherein the offset edge portions are helical.

13. The cutting insert according to claim 12 wherein the offset edge portions are parallel to one another.

14. The cutting insert according to claim 11 wherein the transition edge portion means is curved such that the transition edge portion means lies on the surface of a circumscribing cylinder defined by the rotation of the cutting edge about the axis of the rotary milling tool.

15. The cutting insert according to claim 14 wherein the transition edge portion means is helical.

16. The cutting insert according to claim 11 wherein the side face of the insert adjacent the cutting edge includes a continuously curved relief surface adjacent each of the offset edge portions, and wherein at least a portion of the relief surface between said cutting edge and said side face is rounded for reinforcing the strength of the cutting edge.

17. The cutting insert according to claim 11 wherein the top face includes a continuously curved rake surface adjacent each of the offset edge portions.

18. The cutting insert according to claim 10 wherein the offset edge portions of the cutting edge are disposed at an angle relative to the bottom face of the insert for increasing an axial rake angle of the edge portions relative to said axis of rotation.

19. The cutting tool according to claim 11 wherein a radial rake angle and a relief angle of a rake surface of said cutting edge substantially increases from a leading and a trailing end of said cutting edge.

20. A cutting insert for use in a milling tool that rotates about an axis, comprising:
   (a) an insert body including a bottom face, a top face, and a side face extending between the top and bottom faces;
   (b) a stepped cutting edge defined at the intersection of the top face and the side face for engaging and cutting a workpiece, and including at least two offset edge portions, each of which creates a chip segment, and each of which are convexly curved such that said edge portions lie on the surface of a circumscribing cylinder defined by the rotation of the cutting edge about the axis of the milling tool, and
   (c) means joining the offset edge portions for engaging and cutting the workpiece and for creating a separate, thinner chip segment between the chip segments created by the offset edge portions for facilitating the breaking of all of said chip segments including a substantially straight transition edge portion, said transition edge portion intersecting said offset edge portions in an obtuse angle.

* * * * *